UNITED STATES PATENT OFFICE.

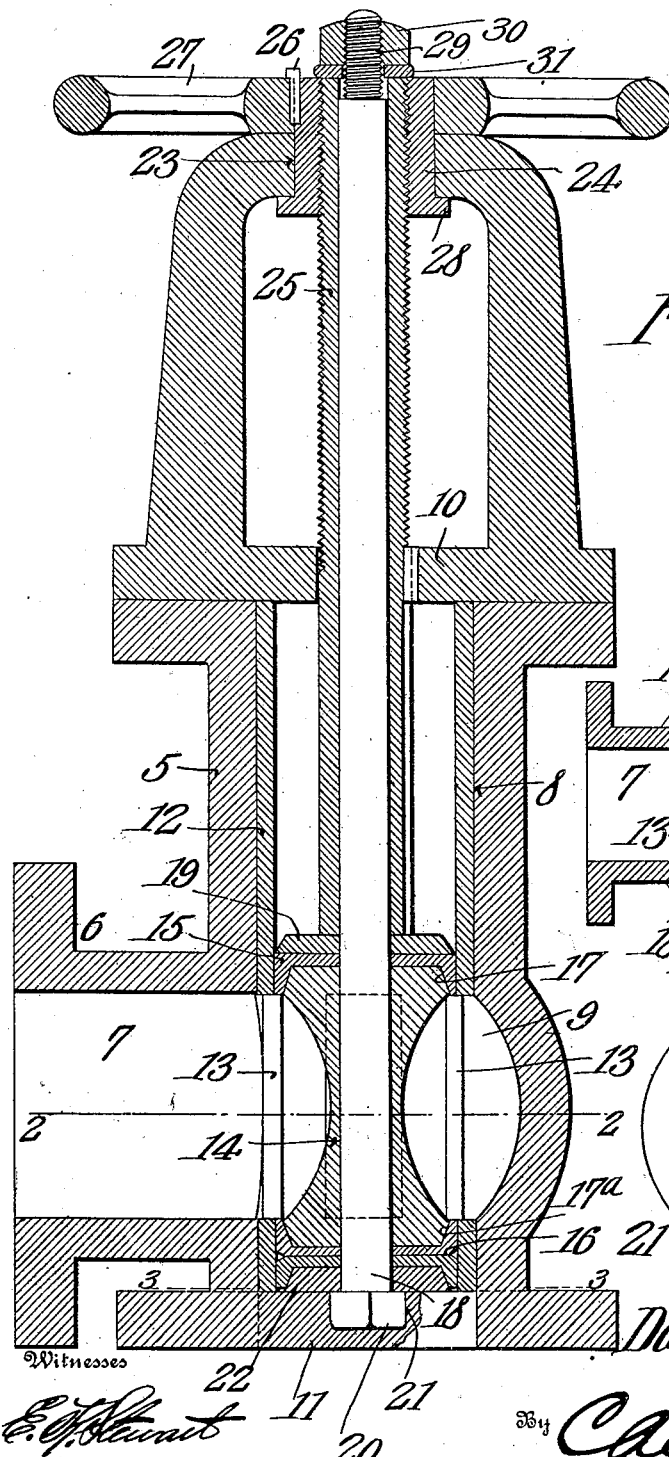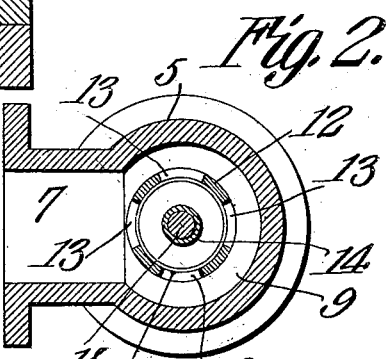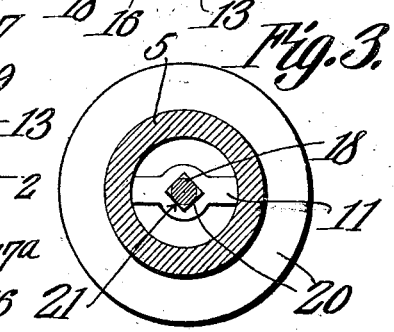

DAVID GEORGE DAVIS, OF PUNXSUTAWNEY, PENNSYLVANIA.

VALVE.

No. 923,413.        Specification of Letters Patent.        Patented June 1, 1909.

Application filed March 1, 1909. Serial No. 480,566.

*To all whom it may concern:*

Be it known that I, DAVID GEORGE DAVIS, a citizen of the United States, residing at Punxsutawney, in the county of Jefferson and State of Pennsylvania, have invented a new and useful Valve, of which the following is a specification.

The valve which is the subject of the present invention is designed more particularly for a boiler blowoff, although its structure is such that it is capable of general application.

The object of the invention is to provide a valve which is non-seating and which is adjustable to take up wear, under pressure.

The invention also has for its object to provide a valve structure in which a packing for the valve stem is unnecessary.

A still further object of the invention is to provide a structure whereby the valve is balanced, in order that it may be easily operated.

With the foregoing objects in view, as well as others which will be apparent when the nature of the invention is better understood, the same consists in a novel construction and arrangement of parts to be hereinafter described and claimed, reference being had to the drawing hereto annexed in which—

Figure 1 is a central vertical section of the valve. Fig. 2 is a section on the line 2—2, and Fig. 3 a section on the line 3—3 of Fig. 1, both of said views being drawn to a reduced scale.

The casing of the valve comprises a cylindrical body 5 having on one side a branch 6. The bore 7 of the branch communicates with the bore 8 of the body 5. In line with the bore 7, the bore 8 is enlarged to form a groove or channel 9 which is for a purpose to be presently described, said channel communicating with the bore 7.

The valve body 5 is closed at one end by a bonnet 10, and it is open at the other end, said end being the outlet. The inlet to the valve is by the way of the bore 7. Across the outlet end a bridge 11 extends.

The bore 8 is fitted with a bushing or lining 12 of brass, having ports 13, said ports being in the plane of the groove 9, and communicating therewith. The bushing is held in place between the bonnet 10 and the bridge 11.

The valve proper is in the form of a plunger working in the bushing 12, and comprises a body 14, and washers 15 and 16, respectively, the latter being in two sections. The body 14 is circular in cross-section, and gradually decreases in diameter toward the middle from each end, and for a short distance from its end it is tapered as indicated at 17 and 17ª, respectively. The body 14 and the washers 15 and 16 are carried by a stem 18, said parts being apertured centrally to receive said stem. The stem 18 also carries a washer 19, and between this washer and the tapered end 17, the washer 15 is located. That face of the washer which is engaged by the washer 19 is flat, and the opposite face which is engaged by the tapered end 17 of the body 14 is recessed to receive said end, the side walls of the recess corresponding to the taper. The stem is provided with a squared head 20 which seats in a correspondingly shaped recess 21 in the bridge 11, whereby said stem is held against rotation. Between this head and the washer 16, the stem carries a frusto-conical or tapered washer 22, and between this washer, and the tapered end 17ª of the body 14, the washer 16 is located, the face of the washer which is engaged by said tapered end 17ª being recessed to receive said end, and its opposite face which is engaged by the washer 22 is recessed to receive said washer. The side walls of both recesses are tapered to correspond to the tapers of the parts extending thereinto. The washers 15 and 16 are made of leather or other flexible material which may be expanded under pressure, and the body 14, as well as the washers 19 and 22 are made of metal.

The bonnet 10 is provided with a hub 23 in which is rotatably mounted a nut 24 through which extends a sleeve 25 having external threads which engage the threads of the nut. This sleeve is fitted over the stem 18, and is engageable at its inner end with the washer 19. To the nut 24 is secured by a key 26 a hand-wheel 27. The inner end of the nut is formed with an annular flange 28 forming a shoulder which abuts against the inner end of the hub, and as the opposite end of the hub is engaged by the hand-wheel 27, it will be seen that the nut is prevented from traveling when it is rotated by the hand-wheel.

The upper end of the stem 18 is reduced and screwthreaded as shown at 29, and on said end is screwed a nut 30. Between the base of this nut, and the upper end of the sleeve 25 is interposed a washer 31. The purpose of the nut 30 is to adjust the valve to take up wear. As the washers 15 and 16 are of leather or other flexible material they expand when subjected to pressure and said washers are adapted to be pressed between the body 14 and the washers 19 and 22 upon turning the nut 30 in the proper direction. By thus expanding the washers 15 and 16 until they fit snugly in the bushing 12, leakage of the valve is effectually prevented. Said washers readily expand when the nut 30 is operated as stated, by reason of the tapers 17 and 17ᵃ of the body 14, and the taper of the periphery of the washer 22.

In Fig. 1 the valve is shown as closed. In this position, that end of the valve carrying the washer 16 is below the groove 9. To open the valve, the hand-wheel 27 is turned, which rotates the nut 24, whereby the sleeve 25 is caused to travel upwardly therein, and as said sleeve is connected to the stem 18 by means of the engagement of said sleeve with the washer 31, and the engagement of the latter with the nut 30, said stem 18 is made to travel upwardly with the sleeve. The hand-wheel 27 is turned until the outlet end of the valve body 5 is in communication with the ports 13. The valve has a free and full portage, and the flow is readily controlled by placing more or less area of the ports 13 in communication with the outlet. Upon turning the hand-wheel 27 until the washer 16 is located above the ports 13, the valve will be entirely open. By reason of the shape of the body 14, the valve is practically balanced, and it is therefore easy to operate.

By the structure herein described, a non-seating valve is had, and the adjustment to take up wear may be made under pressure. There is no valve seat to wear out, and a stuffing box and packing for the valve stem is also dispensed with.

What is claimed is:

1. A valve comprising a stem having a head at one end, a pair of washers loosely carried by the stem, one of said washers being engageable with the head, and tapered in form, a member loose upon the stem between the washers and having tapered ends, and expansible washers between the respective ends of said member and the aforesaid washers, the faces of certain of said expansible washers being in contact with the tapered ends of said member and being recessed to receive said ends, and the face of another of said expansible washers engaging the aforesaid tapered washer and having a tapered recess to receive said washer.

2. A valve comprising a stem having a head at one end, and a nut screwed on the other end, a pair of washers loosely carried by the stem, one of said washers being engageable with the head, and tapered in form, a sleeve fitting the stem, and bearing at one end on the other washer, and engageable at the other end by the aforesaid nut, a member loosely mounted on the stem between the washers, and having tapered ends, and expansible washers between the respective ends of the said member and the aforesaid washers, the faces of certain of said expansible washers being in contact with the tapered ends of said member and being recessed to receive said ends, and the face of another of said expansible washers engaging the aforesaid tapered washer and having a tapered recess to receive said washer.

3. A valve comprising a casing, a bonnet, a non-traveling nut carried by the bonnet, a stem having a head at one end, and a nut screwed on the other end, a pair of washers loosely carried by the stem, one of said washers being engageable by the head, and tapered in form, a sleeve fitting the rod, and bearing at one end on the other washer, and engageable at the other end by the aforesaid nut on the stem, said sleeve being externally threaded, and screwing into the aforesaid non-traveling nut, a member loosely mounted on the stem between the washers, and having tapered ends, and expansible washers between the respective ends of said member and the aforesaid washers, the faces of certain of said washers being in contact with the tapered ends of said member and being recessed to receive said ends, and the face of another of said expansible washers engaging the aforesaid tapered washer and having a tapered recess to receive said washer.

4. A valve comprising a casing, a bonnet, a non-traveling nut carried by the bonnet, a stem having a head at one end, and a nut screwed on the other end, a pair of washers loosely carried by the stem, one of said washers being engageable by the head, a sleeve fitting the rod, and bearing at one end on the other washer, and engageable at the other end by the aforesaid nut on the stem, said sleeve being externally threaded, and screwing into the aforesaid non-traveling nut, a member loosely mounted on the stem between the washers, and expansible washers between the respective ends of said member and the aforesaid washers.

In testimony that I claim the foregoing as my own, I have hereto affixed my signature in the presence of two witnesses.

DAVID GEORGE DAVIS.

Witnesses:
JAMES T. McMINN,
T. M. DRAUKER.